Nov. 29, 1949  A. G. F. WALLGREN  2,489,342
DOUBLE-ROW ROLLER BEARING
Filed Dec. 18, 1946  2 Sheets-Sheet 1
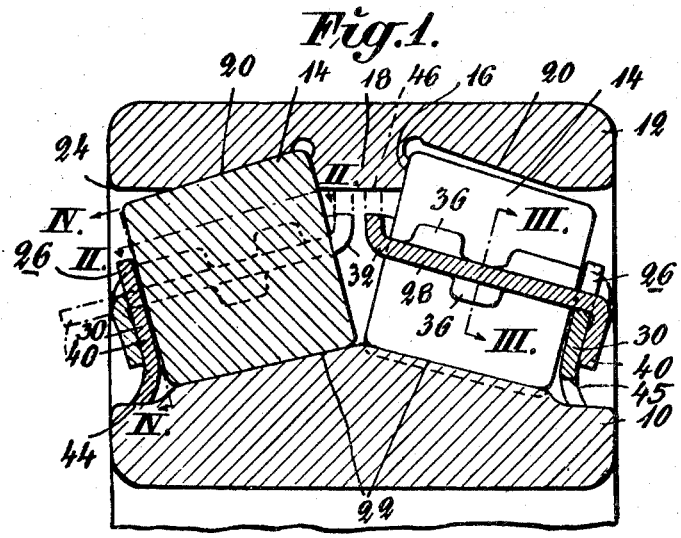
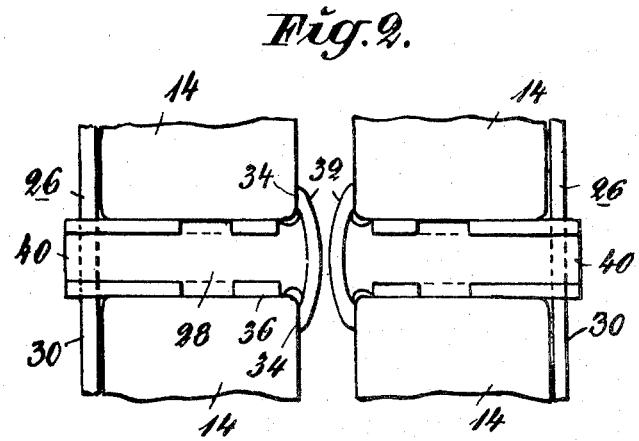
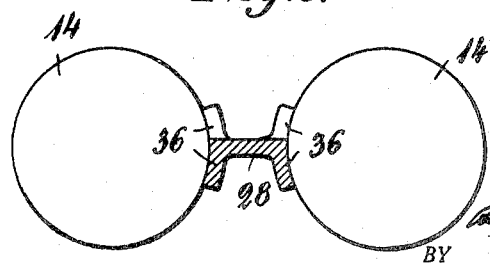

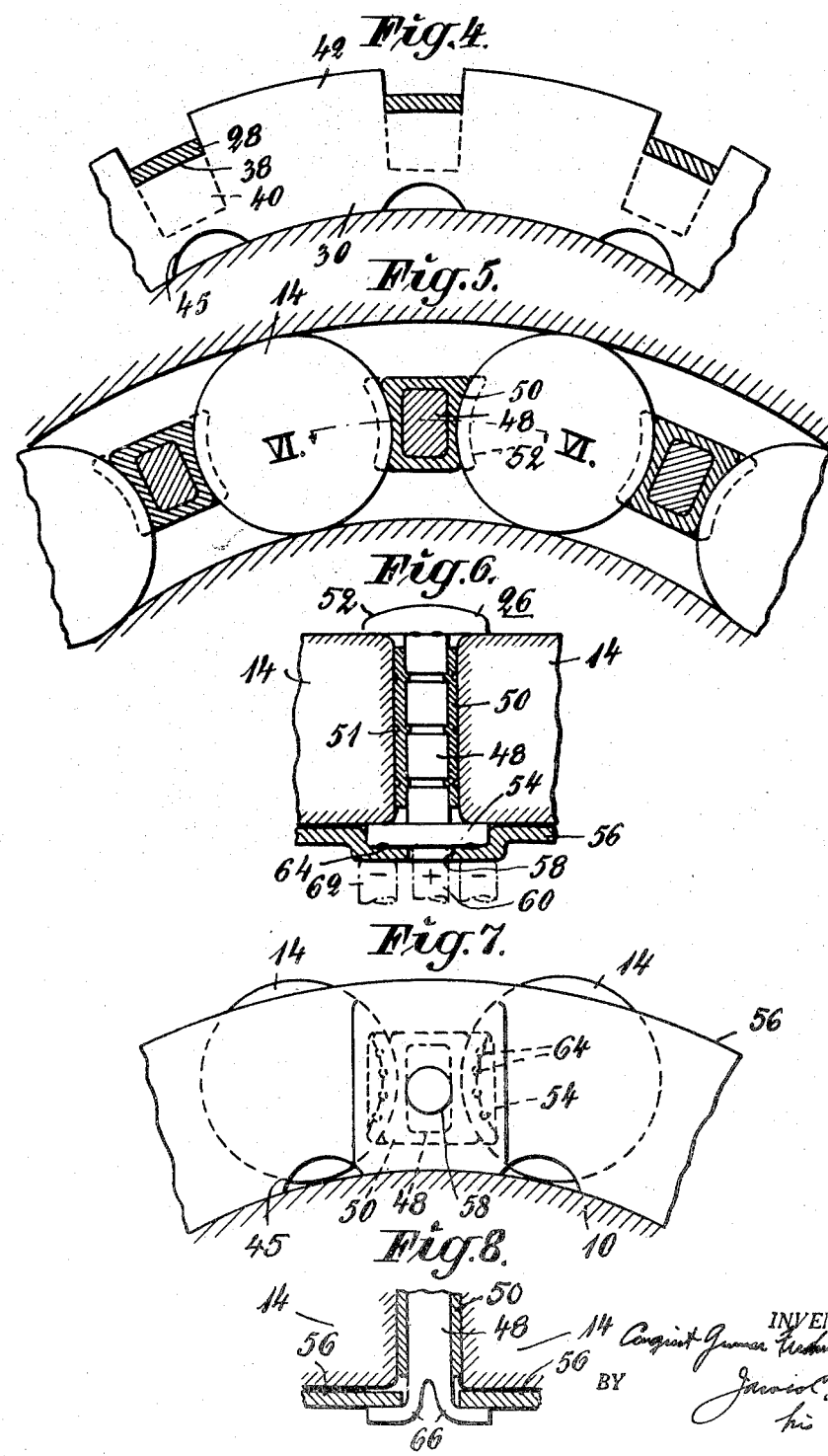

Patented Nov. 29, 1949

2,489,342

UNITED STATES PATENT OFFICE 2,489,342

DOUBLE ROW ROLLER BEARING

August Gunnar Ferdinand Wallgren, Stockholm, Sweden

Application December 18, 1946, Serial No. 717,058
In Sweden December 18, 1945

10 Claims. (Cl. 308—214)

1

This invention relates to double row roller bearings comprising an outer and an inner bearing member with rollers disposed therebetween, said rollers being of an at least substantially conical shape. The rollers are adapted to co-operate with roller ways or rolls as well as with guide surfaces on the bearing members, so that the position of the rollers is axially fixed in both directions, whereby the bearing will be capable of taking up axial thrusts in both of said directions. Roller bearings of this type are described in applicant's copending patent application Ser. No. 666,373, filed May 1, 1946. Each of the bearing members forms a coherent undivided unit in planes at right angles to the axis of the bearing as well as in planes parallel to said axis. According to a particularly valuable design, the outer bearing member has a central guide flange having the end surfaces of the rollers abutting thereagainst, whereas such guide flange fails at the inner bearing member. The roller ways increase in diameter from the sides of the bearing toward the centre thereof so as to form parts of the mantle surface of cones, the apexes of which are positioned on the same side of the centre of the bearing as the respective roller ways. Bearings of this type are cheaper than the double row roller bearings with spherical inner rolling surface on the outer bearing member hitherto used in practice, while showing at the same time a better load capacity and a highly increased life at one and the same radial or axial thrust respectively. By reason of the specific form of the various parts of a double row roller bearing with conical roller ways, roller cages of conventional type cannot be used. In the above mentioned patent application I form the cages of members adapted to be assembled only after the rollers are disposed between the bearing members, so that they will, on the one hand, ensure the relative position of the rollers while being, on the other hand, retained themselves by the rollers so as not to be removed from the bearing.

The object of the invention is to improve bearings of this type from production and cost points of view.

Further objects and advantages of the invention will be apparent from the following description considered in connection with the accompanying drawings, which form a part of this specification, and of which:

Fig. 1 is an axial sectional view of a portion of a double row roller bearing according to one embodiment of the invention.

2

Fig. 2 shows two rollers with intermediate inner cage elements viewed in elevation according to the arrows of the line II—II of Fig. 1.

Figs. 3 and 4 are sectional views on the lines III—III and IV—IV of Fig. 1.

Fig. 5 is a cross sectional view of a portion of a double row roller bearing according to a modified embodiment of the invention.

Fig. 6 is a sectional view on the line VI—VI of Fig. 5.

Fig. 7 shows a portion of the same bearing in elevation.

Fig. 8 shows a portion of a bearing in the same section as in Fig. 6 according to a third embodiment of the invention.

Throughout the figures, the same reference characters are used for equivalent parts.

In the embodiment according to Figs. 1-4, 10 designates the inner ring and 12 the outer ring of the bearing, said rings having two rows of conical rollers 14 inserted therebetween. These rollers abut with their inner end surfaces 16, which are preferably of a slightly convex spherical shape in known manner, against a central annular flange 18 of the outer ring 12. The latter has two roller ways or bearing races 20 of a conical or approximately conical shape, the diameter of which increases in a direction toward the centre of the outer ring. Likewise, the inner ring 10 has two conical or approximately conical roller ways or bearing races 22, one for each row of rollers, the diameter of which increases in a direction toward the centre of the ring. The races 20 and 22 for a row of rollers converge, the same as the conical surface of the rollers, in a manner such as to form a portion of the mantle surface of cones, the apexes of which meet at a common point on the bearing axis, which point is situated on the same side of the centre of the bearing as the row of rollers under consideration. The position of the rollers 14 is axially fixed in both directions by reason of such formation of the races and by the presence of the central guide flange 18.

To permit an assembly of rollers in the desired number, the outer bearing ring will have to be subjected to an elastic deformation simultaneously with the arrangement of the inner ring in the same, as described more fully in my aforesaid patent application. Here, it is of advantage upon hardening of the outer ring, which is made from steel, to remove the decarbonized surface layer, inasmuch as the deformation, which the ring can then experience without detriment while straining the material up to a point just below its yield limit, becomes great. In order furthermore to facilitate the insertion of the rollers 14, the races 20 may terminate at a distance from the outwardly turned end surfaces of the rollers by a corresponding removal of material from the outer ring, as indicated at 24. The circumstance that the outer races 20 are rendered shorter thereby than the inner races 22, is of no import for the load capacity of the bearing.

The relative position of the rollers 14 is ensured by means of two roller cages generally designated by 26. Each cage is composed of separating members 28 projecting between the rollers, and of an integral ring or disk 30 extending about the circumference of the bearing. The separating members 28 have a collar or enlarged portion 32 at the end thereof located at the centre of the bearing, said collar being of greater width than the portion of the separating member located between two rollers. Said portion will consequently grip behind the two rollers, against the end surfaces 16 of which it abuts with surfaces 34. To increase the contact surfaces between the separating members 28, which are made from sheet-metal material, and the rollers 14, the former may have bent flaps 36 fitted to the shape of the rollers. A separating member constructed in this way obviously cannot be mounted between two rollers, unless the latter are temporarily removed from each other, until the portion 32 has been brought into position behind the rollers. After the separating members have been introduced between the rollers, they are united with the lateral ring 30. In the embodiment according to Figs. 1–4, said ring is provided with recesses 38 opposite the separating members, which may have a projecting part 40 adapted to take the position shown by dash and dot lines in Fig. 1, when the lateral ring is assembled. Said part 40 is then bent down toward the ring and united therewith by spot welding. During this operation, electrodes are applied to the external side of the part 40 as well as to the portions 42 of the ring 30 remaining between the recesses 38, so that the current will not pass through the bearing otherwise. It is understood that the separating members 28 with the collar portion 32 cannot be introduced into the last space between two rollers, after the other roller spaces have been occupied by separating members, inasmuch as said two rollers cannot then be displaced peripherally from each other. Here, the separating member 28 is thus without any collar portion. However, it will frequently be found advantageous to use separating members without a collar portion at two or more evenly distributed points round the peripheral portion of the bearing, said separating members being then maintained in position by the other separating members and the lateral ring 30.

The cage ring 26 may slide with the internal surface thereof on a surface 44 of the inner ring 10, a number of recesses 45 being preferably provided in the inner edge of the cage ring for the introduction of grease into the bearing. Concurrently with or instead of this formation of the cage ring 26, the collar portions 32 may be extended, as indicated by dash and dot lines 46 in Fig. 1, so that they will slide on the central flange 18 of the outer ring.

In the embodiment according to Figs. 5–7, the portions of the separating members disposed between the rollers are composed of rods 48 and linings 50 surrounding the same, the former being made from steel or iron and the latter from bearing bronze or the like. The lining 50, which consequently bears on the rollers, may be secured relatively to the rod 48 by means of depressions 51. Welded to both ends of the rods 48 are plates 52 and 54 of a greater width than that of the rods, so that they will extend over the ends of two adjacent rollers 14. The plate 52 is adapted to be disposed at the centre of the bearing and the plate 54 at the outer side thereof. The distance between the two plates corresponds to the length of the rollers. After separating members constructed in this manner have been introduced between the rollers during their temporary removal from each other according to the above, an annular disk 56 extending about the bearing is placed against the plates 54, said disk being preferably provided with elevations corresponding to the shape of the plates. The disk is provided with recesses 58 opposite the rods 48. The one (positive) electrode 60 (Fig. 6) of a welding machine is introduced into said recesses, while the other electrode 62 is applied laterally thereof, so that the plate 54 is welded to the disk at a suitable number of points 64. The requisite abutting pressure is ensured by the fact that the plates 54 bear on the rollers 14, which are in turn guided by the central flange 18.

The embodiment according to Fig. 8 differs from the preceding one only in that the rods 48 are split at their outwardly turned end portion into flaps 66, which are thrust through the recesses 58 of the disk 56 and are then folded apart and secured to the disk by point welding.

The space between two rollers is of a constant width in the longitudinal direction of the rollers in a plane extending approximately through the centre lines of said rollers. On the other hand, if a plane be positioned obliquely to said plane, for instance so as to intersect the centre of the rollers at the outer end thereof, and is situated in a direction toward the centre of the bearing, inside said centre, the space between the rollers attains an inwardly augmenting width in the obliquely set plane. Now, if supporting members are introduced along such an obliquely set plane, they may evidently be made wider inwardly toward the centre of the bearing, which results in the condition that the same cannot be drawn out on having been mounted fast to the lateral ring of the cage. Consequently, it is not necessary that special collars or plates be provided, which extend inwardly over the inner end surfaces of the rollers, even if this latter construction is to be preferred. It is also conceivable to make the lateral rings or disks of the cages divided.

While one more or less specific embodiment of the invention has been shown, it is to be understood that this is for purpose of illustration only, and the invention is not to be limited thereby, but its scope is to be determined by the appended claims.

What I claim is:

1. A double row roller bearing comprising an outer and an inner bearing member with rollers provided therebetween, said rollers being of at least substantially conical shape, and being axially fixed in both directions by means of races as well as by means of guide surfaces on the bearing elements, the rollers being maintained in the desired peripheral position by means of separating members arranged between the rollers and having within the bearing a first portion of a greater width than that of a second portion situated nearer to the lateral face of the bearing, viewed in the axial direction, so that the first-mentioned portion prevents retraction of the separating members, the separating members being only at the outer side thereof united with an annular cage member adapted to keep the same together.

2. A double row roller bearing according to claim 1, in which said first portion of the separating members is disposed between the rows of rollers, the same being adapted to abut against the end surface of the rollers.

3. A double row roller bearing according to claim 1, in which said first portion comprises a separate member situated between the rows of bearings and secured to said second portion of the separating members.

4. A double row roller bearing according to claim 1, in which the separating members are of a greater width at the two ends thereof than at the portion thereof disposed between the rollers.

5. A double row roller bearing according to claim 1, in which said second portion of the separating members is surrounded by a lining of bearing metal.

6. A double row roller bearing according to claim 1, in which the separating members are extended radially within the bearing so as to abut against a separating flange arranged centrally on the outer bearing element of the bearing.

7. A double row roller bearing according to claim 1, in which the annular cage member is provided with recesses at the outer peripheral portion thereof, the separating members having end portions fitting into said recesses and being bent over the cage member and rigidly connected to the latter.

8. A double row roller bearing according to claim 1, in which the annular cage member abuts with its inner peripheral portion against the inner bearing member.

9. A double row roller bearing according to claim 1, in which the cage member is provided with apertures opposite the separating members.

10. A double row roller bearing according to claim 1, in which less than the total number of separating members is provided with a widened first portion.

AUGUST GUNNAR FERDINAND WALLGREN.

REFERENCES CITED

The following references are of record in the file of this patent:

UNITED STATES PATENTS

| Number | Name | Date |
| --- | --- | --- |
| 1,588,446 | Chisholm | June 15, 1926 |
| 1,787,712 | Wooler | Jan. 6, 1931 |
| 1,794,772 | Hughes | Mar. 3, 1931 |
| 1,843,293 | Medved | Feb. 2, 1932 |
| 1,941,460 | Boden | Jan. 2, 1934 |